Nov. 10, 1959     H. E. MILLS     2,911,754
FISHING FLOAT
Filed July 17, 1957
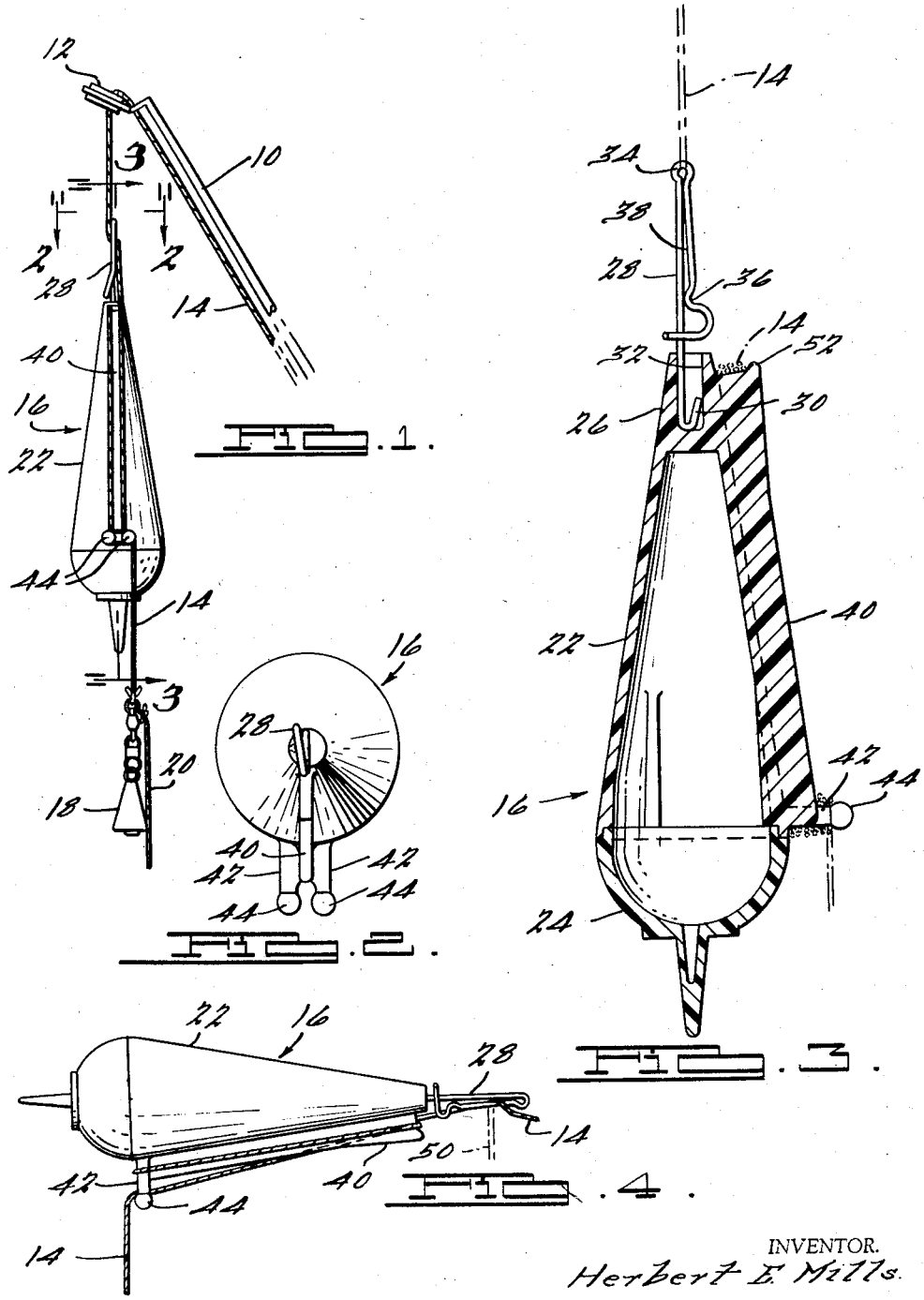
INVENTOR.
Herbert E. Mills.
BY
Balluff & McKinley
ATTORNEYS 2,911,754

FISHING FLOAT

Herbert E. Mills, Detroit, Mich.

Application July 17, 1957, Serial No. 672,445

1 Claim. (Cl. 43—43.11)

This invention relates to a fishing float and has particular reference to a float having provisions for facilitating casting of a fishing line having a lure or baited hook thereon with the float or bobber secured on the line inwardly of the hook end of the line.

In fishing tackle of the type employing a float and in which the hook and sinker are secured toward the end of the line from the float, it is difficult to cast with such equipment because of the relatively long length of line between the float and the baited hook or lure, which is apt to become tangled. In addition, it is difficult to cast with any accuracy. The present invention is directed to a novel fishing float or bobber having provisions by which the portion of the line between the float and the sinker or hook may be wound up on the float to provide a very compact and thus easily castable tackle assembly. The construction is such that as soon as the float hits the water and assumes its normal floating position the line will automatically unwind therefrom so that the weighted end of the line and the hook will drop to their proper positions beneath the float. By means of this construction, casting with fishing tackle of this type is greatly facilitated and much greater accuracy is possible, while at the same time the possibility of fouling the line or incurring injury from the hook is greatly reduced.

A principal object of the invention is to provide a novel fishing float.

A further object of the invention is to provide a fishing float having provisions thereon about which a portion of the fishing line may be wound to facilitate casting operations.

Other and further objects of the invention will be apparent from the following description and claim and may be understood by reference to the accompanying drawing, which by way of illustration shows a preferred embodiment of the invention and what I now consider to be the best mode in which I have contemplated applying the principles of my invention. Other embodiments of the invention may be used without departing from the scope of the present invention as set forth in the appended claim.

In the drawings:

Fig. 1 is an elevational view of a fishing tackle embodying the float of the present invention;

Fig. 2 is an end elevational view of the float taken on line 2—2 of Fig. 1;

Fig. 3 is a longitudinal sectional view of the float taken on line 3—3 of Fig. 1; and Fig. 4 is a side elevational view of the float shown in its normal floating position.

The fishing tackle shown in Fig. 1 includes a fishing rod 10, the upper end of which is shown and which is provided with an eyelet 12 through which the fishing line 14 passes in a conventional manner. The tackle further includes a novel float 16, a sinker 18 attached to the end of the line, and a leader 20 connected to the line adjacent the sinker and to which a conventional hook or lure may be secured.

Fishing tackle of the type described is conventional so far as the elements thereof are concerned, but ordinarily a considerable length of line extends between the point of connection of the line to the float and the sinker or the leader to which the hook is secured, thus making it difficult to cast such equipment with any degree of accuracy. The float 16 which forms the subject matter of this invention comprises an elongated hollow body which, as shown, is substantially conical in shape. The float body 16 may be made of a suitable plastic material and may comprise a main body section 22 and a head 24 cemented or otherwise secured to the main body section 22. The float may be made of any other suitable material and may have any suitable shape within the requirements hereinafter described.

The float is provided at one end 26 with a wire clip 28 for securing the float to the line 14. The clip 28 has a hooked end 30 inserted into a socket 32 in the end 26 of the float body 22. The hooked end 30 of the clip 28 is merely pushed into the socket 32 and is adapted to imbed itself into the material of the float body when a pull is exerted on the clip. The clip 28 extends outwardly from the float body to a loop 34 at its outer end and extends back along the main part of the clip to a ridge 36 which engages or is closely spaced from the straight portion of the clip 28. The tapered slot 38 thus formed between the two portions of the clip is adapted to receive the line 14 and the line may be slid toward the narrow end of the slot 38 until the line is tightly wedged therein to secure the float to the line. The position of the float on the line may be adjusted by pulling the line into the loop 34 or in the opposite direction past the ridge 36 so that the float may be slid to the desired location on the line and then fastened thereon in the manner described.

The float body is provided with an integral rib 40 which extends radially outwardly from the body and longitudinally along one side thereof for substantially the full length of the body section 22. Adjacent the forward end of the rib 40 there is provided one or more pins 42 having slightly enlarged heads 44. The rib 40 provides what may be termed a spool and that portion of the line 14 between its point of connection with the clip 28 and the sinker 18 or leader 20 may be wound about the rib 40 in the manner illustrated in the drawings, thereby drawing up the sinker and hook into close proximity with the float 16 to provide a compact unit readily adapted to be cast.

The rib 40 is adapted to receive relatively long turns of the line 14 while the pins 42 are adapted to receive the last few relatively short turns of the line so that the weighted end of the line may be brought up as closely as possible to the float body. The rib or spool 40 is arranged on the float body in such manner that the rib extends in a substantially vertical plane when the float is suspended from the line in the manner shown in Figs. 1 and 3. In such position the axis of the spool extends substantially horizontally and the line will remain wound thereon since the force exerted by the weighted end of the line acts in a downward direction.

The float is shown in Fig. 4 in its normal floating position in which the rib 40 is disposed beneath the float body and lies in a substantially vertical plane. As soon as the float attains this position, the weight of the sinker or lure will cause the line to slide off of and unwind from the spool means and to drop downwardly beneath the float. The line is shown in Fig. 4 as partially unwound from the rib 40 and, when the line is completely unwound, it will assume the dotted-line position 50 indicated in Fig. 4. The end edges of the rib 40 are shaped so that the line can slide freely therefrom simply by gravity. The line will first unwind from the pins 42 and then from the rib 40. The heads 44 on the pins 42 and a slight projection 52 at the opposite end of the rib will offer negligible resistance to the unwinding of the line and will aid in retaining the line on the spool in the casting position. It is contemplated that such provisions may be omitted if desired.

The term "spool" is used herein in its broadest sense and it will be apparent that the spool may take any desired form other than the longitudinally extending rib illustrated in the drawings. The spool means must be arranged on the body in such manner that when the body is suspended from the line the line will remain wound on the spool, and when the body is in its floating position the line must freely unwind from the spool.

While I have illustrated and described a preferred embodiment of my invention, it is understood that this is capable of modification, and I therefore do not wish to be limited to the precise details set forth but desire to avail myself of such changes and alterations as fall within the purview of the following claim.

I claim:

A fishing float comprising an elongated hollow float body having provisions at one end for securing said body to a fishing line at a point inwardly from the end of the line, said body having an integral longitudinally extending rib providing a spool means about which may be wound a portion of the line between its end and point of connection with said body, said float body having a pair of integral pins projecting therefrom and disposed at one end of said rib and lying in a plane transverse to the plane of said rib, said pins having enlarged heads and providing a second spool means about which the end portion of the line may be wound alternately in opposite directions in figure-8 fashion, said pins being closely spaced so that the tendency of the line, due to its resiliency, to unwind from one of the pins will be restrained by engagement of the line with the other of said pins, said spool means being arranged on said float body so that when said body is freely suspended from the line the latter will remain wound on said spool means, and so that said spool means will be disposed beneath the float body when the latter strikes the water thereby permitting the line to slide off of and unwind from said spool means.

References Cited in the file of this patent

UNITED STATES PATENTS

| | | |
|---|---|---|
| 1,885,311 | Whitcomb | Nov. 1, 1932 |
| 1,918,507 | Westling | July 18, 1933 |
| 2,592,441 | Louthan | Apr. 8, 1952 |